(12) United States Patent
Goslin et al.

(10) Patent No.: US 10,788,966 B2
(45) Date of Patent: Sep. 29, 2020

(54) SYSTEMS AND METHODS FOR INTERACTING WITH A VIRTUAL INTERFACE (71) Applicant: Disney Enterprises, Inc., Burbank, CA (US)

(72) Inventors: Michael P. Goslin, Burbank, CA (US); Joseph Olson, Burbank, CA (US); Jason Yeung, Burbank, CA (US)

(73) Assignee: Disney Enterprises, Inc., Burbank, CA (US)

(*) Notice: Subject to any disclaimer, the term of this patent is extended or adjusted under 35 U.S.C. 154(b) by 626 days.

(21) Appl. No.: 15/428,571

(22) Filed: Feb. 9, 2017

(65) Prior Publication Data
US 2017/0228139 A1 Aug. 10, 2017

Related U.S. Application Data (60) Provisional application No. 62/293,751, filed on Feb. 10, 2016.

(51) Int. Cl.
G06F 3/00 (2006.01)
G06F 3/0484 (2013.01)
G06F 3/01 (2006.01)

(52) U.S. Cl.
CPC .......... G06F 3/04845 (2013.01); G06F 3/011 (2013.01); G06F 3/017 (2013.01)

(58) Field of Classification Search
CPC .................................. G06F 3/04845
See application file for complete search history.

(56) References Cited

U.S. PATENT DOCUMENTS

| 8,638,708 | B2 | 1/2014 | Kish |
| 9,479,727 | B1 | 10/2016 | Kolodizner |
| 2004/0233223 | A1* | 11/2004 | Schkolne ............... G06F 3/0346 345/621 |
| 2006/0256072 | A1* | 11/2006 | Ueshima ................ A63F 13/02 345/156 |
| 2008/0198275 | A1 | 8/2008 | Kinouchi |
| 2008/0274813 | A1* | 11/2008 | Sato ....................... A63F 13/10 463/43 |
| 2009/0077504 | A1* | 3/2009 | Bell ....................... G06F 3/011 715/863 |
| 2009/0196567 | A1 | 8/2009 | Sugimoto |
| 2009/0280901 | A1* | 11/2009 | Casparian ............... A63F 13/06 463/37 |
| 2009/0303231 | A1* | 12/2009 | Robinet ............... G06F 3/04815 345/419 |

(Continued)

OTHER PUBLICATIONS

H. Shulzrinne et al., "RTP: A Transport Protocol for Real-Time Applications," Network Working Group, RFC 3550, Jul. 2003, 89 pages.

Primary Examiner — Kieu D Vu
Assistant Examiner — Andrew Chung
(74) Attorney, Agent, or Firm — Esplin & Associates, PC (57) ABSTRACT This disclosure relates to systems and methods for interacting with a virtual interface. The virtual interface may include a virtual object. The virtual object may correlate with an instruction to change the virtual interface. A user's interaction with the virtual object may be determined. The virtual interface may be changed in accordance with the instruction.

14 Claims, 7 Drawing Sheets

(56) References Cited

U.S. PATENT DOCUMENTS

| | | | |
|---|---|---|---|
| 2010/0013860 A1* | 1/2010 | Mandella | G01B 21/04 345/650 |
| 2010/0137050 A1* | 6/2010 | Yoshida | A63F 13/10 463/8 |
| 2010/0180315 A1 | 7/2010 | Nakamichi | |
| 2011/0074776 A1* | 3/2011 | Katz | G06F 3/0325 345/419 |
| 2011/0128555 A1* | 6/2011 | Rotschild | G02B 27/2271 356/625 |
| 2011/0138022 A1 | 6/2011 | Xie | |
| 2011/0276712 A1 | 11/2011 | Narula | |
| 2013/0042296 A1* | 2/2013 | Hastings | G06F 21/10 726/1 |
| 2013/0152153 A1 | 6/2013 | Weiser | |
| 2013/0198634 A1 | 8/2013 | Matas | |
| 2014/0002329 A1* | 1/2014 | Nishimaki | G06K 7/1404 345/8 |
| 2014/0056426 A1 | 2/2014 | Ducharme | |
| 2014/0104169 A1* | 4/2014 | Masselli | G01B 11/00 345/157 |
| 2014/0361956 A1* | 12/2014 | Mikhailov | G02B 27/0179 345/8 |
| 2014/0364209 A1* | 12/2014 | Perry | G06F 3/013 463/31 |
| 2014/0368533 A1* | 12/2014 | Salter | G02B 27/017 345/619 |
| 2015/0170419 A1* | 6/2015 | Ohashi | G09G 5/00 345/419 |
| 2015/0194047 A1 | 7/2015 | Lu | |
| 2015/0205494 A1* | 7/2015 | Scott | G06F 3/04845 345/158 |
| 2015/0258431 A1* | 9/2015 | Stafford | A63F 13/213 463/31 |
| 2016/0054837 A1* | 2/2016 | Stafford | G06F 3/012 463/33 |
| 2016/0084960 A1* | 3/2016 | Harrison | G01C 3/00 356/4.03 |
| 2016/0142648 A1 | 5/2016 | Gopinath | |
| 2016/0171771 A1* | 6/2016 | Pedrotti | G02B 27/017 345/633 |
| 2016/0175702 A1* | 6/2016 | Black | A63F 13/28 463/31 |
| 2016/0187974 A1* | 6/2016 | Mallinson | G06F 3/014 463/32 |
| 2016/0196692 A1* | 7/2016 | Kjallstrom | G06T 19/006 345/633 |
| 2016/0217614 A1* | 7/2016 | Kraver | G06T 19/006 |
| 2016/0239080 A1 | 8/2016 | Marcolina | G06F 3/011 |
| 2016/0274662 A1* | 9/2016 | Rimon | G06F 3/014 |
| 2017/0054770 A1 | 2/2017 | Wells | |
| 2017/0186465 A1 | 6/2017 | Walters | |
| 2018/0070049 A1 | 3/2018 | Pinheiro E Mota | |

\* cited by examiner

SYSTEMS AND METHODS FOR INTERACTING WITH A VIRTUAL INTERFACE

FIELD

This disclosure relates to systems and methods for interacting with a virtual interface.

BACKGROUND

A virtual interface may include one or more options for changing the virtual interface. Interacting with the virtual interface may not be intuitive or engaging to a user.

SUMMARY

This disclosure relates to interacting with a virtual interface. The virtual interface may include a virtual object. The virtual object may correlate with an instruction to change the virtual interface. An overlay image comprising the virtual interface may be determined. The overlay image may be displayed on a display so that the virtual object appears as a part of the virtual interface. A first interaction with the virtual object may be determined. Responsive to the first interaction with the virtual object, the virtual interface may be changed in accordance with the first instruction.

A system for interacting with a virtual interface may include one or more of a display, an image sensor, first motion and orientation sensor, one or more physical processors, and/or other components. In some implementations, the system may include an object. The object may carry a second motion and orientation sensor. In some implementation, the image sensor and/or the one or more processors may be carried on the display. The field of view of the image sensor may be a function of the position and/or the orientation of the display, and/or other information.

The display may be configured to display an overlay image and/or other information. The display may include one or more devices that may present information visually. In some implementations, the display may include one or more screens of one or more display devices. In some implementations, the display may include one or more display devices. In some implementations, the display may include one or more of a head-mounted display, an optical head-mounted display, a see-through display, an optical see-through display, a video see-through display, a visor, eyeglasses, sunglasses, a smartphone, a tablet, a mobile device, a projector, and/or other displays.

The image sensor may be configured to generate visual output signals conveying visual information within a field of view of the image sensor. Visual information may include one or more of an image, a video, and/or other visual information. The image sensor may include one or more of a charge-coupled device sensor, an active pixel sensor, a complementary metal-oxide semiconductor sensor, an N-type metal-oxide-semiconductor sensor, and/or other image sensors.

The first motion and orientation sensor may be carried by the display. The first motion and orientation sensor may be configured to generate first motion and orientation output signals conveying motion and/or orientation information of the display. Motion and/or orientation information of the display may characterize one or more motion and/or orientation of the display. In some implementations, the first motion and orientation sensor may include one or more of an inertial measurement unit, a magnetic position sensor, a radio-frequency position sensor, and/or other motion and orientation sensors.

The second motion and orientation sensor may be carried by an object (e.g., a hilt, etc.). The second motion and orientation sensor may be configured to generate second motion and orientation output signals conveying motion and/or orientation information of the object. Motion and/or orientation information of the object may characterize one or more motion and/or orientation of the object. In some implementations, the second motion and orientation sensor may include one or more of an inertial measurement unit, a magnetic position sensor, a radio-frequency position sensor, and/or other motion and orientation sensors.

In some implementations, a landmark may be carried by the object. The landmark may indicate a reference point for the object that facilitates determination of an overlay position and/or an overlay orientation for a visual effect that may augment the appearance of the object. In some implementations, the object may include a hilt and the visual effect may include a virtual blade.

A virtual interface may include one or more virtual objects. A virtual interface may include one or more visual effects. A virtual object may correlate with one or more instructions to change the virtual interface. An instruction to change the virtual interface may include one or more commands to change the interface at a time or over a period of time. For example, an instruction to change the virtual interface may include one or more commands to provide more information regarding the virtual object, change the virtual interface into another virtual interface, exit the virtual interface, and/or other commands. In some implementations, a virtual object may correlate with a first instruction to change the virtual interface and a second instruction to change the virtual interface, the first instruction being different from the second instruction.

The one or more physical processors may be configured by machine-readable instructions. Executing the machine-readable instructions may cause the one or more physical processors to facilitate interacting with a virtual interface. The machine-readable instructions may include one or more computer program components. The computer program components may include one or more of a position and orientation component, an interface effects component, a visual effects component, an overlay component, a display component, an interaction component, and/or other computer program components.

The position and orientation component may be configured to determine an overlay position and/or an overlay orientation for a virtual interface based on the visual output signals and/or the first motion and orientation output signals. In some implementations, the position and orientation component may be configured to determine an overlay position and/or an overlay orientation for a visual effect based on the visual output signals and/or the second motion and orientation output signals.

The position and orientation component may be configured to determine one or more interactions with the virtual object. In some implementations, the position and orientation component may be configured to determine an interaction of a user with the virtual object based on a user interaction. In some implementations, the position and orientation component may be configured to determine an interaction of a visual effect (e.g., a virtual blade, etc.) with the virtual object based on the overlay position and the overlay orientation for the visual effect and the overlay position and the overlay orientation for the virtual interface.

The interface effects component may be configured to select a virtual interface. In some implementations, the interface component may be configured to select a particular instruction based on an interaction type of a user with the virtual object. For example, different types of interaction of a user (e.g., the virtual blade/wand/user's hand) with the virtual object may include the virtual blade/wand/user's hand touching the virtual object, the virtual blade/wand/user's hand slashing the virtual object, the virtual blade/wand/user's hand stabbing the virtual object, the virtual blade/wand/user's hand pointing to the virtual object, the virtual blade/wand/user's hand/head/eyes(s) pointing to the virtual object while a user input (e.g., voice command, button press, etc.) is detected, and/or other type of interactions.

The visual effects component may be configured to select a visual effect (e.g., a virtual blade, etc.). A visual effect may refer to one or more information that may be observed visually. A visual effect may be static or dynamic, and may be visually observable at a time, over a period of time, at a location, or over a range of locations. A visual effect may include one or more of an image, a video, and/or other visual effects.

The overlay component may be configured to determine an overlay image. The overlay image may include a virtual interface determined by the interface effects component. The virtual interface may be placed within the overlay image according to the overlay position and/or the overlay orientation for the virtual interface. In some implementations, the overlay image may include a visual effect (e.g., a virtual blade of a virtual weapon, etc.) determined by visual effects component. The visual effect (e.g., virtual blade) may be placed within the overlay image according to the overlay position and the overlay orientation for the visual effect.

The display component may be configured to effectuate displaying of an overlay image on a display. The displaying may be effectuated so that the virtual object appears as a part of the virtual interface. In some implementations, the displaying may be effectuated so that a virtual blade appears to be attached to a hilt.

The interaction component may be configured to, responsive to an interaction with the virtual object, change the virtual interface in accordance with an instruction. The interaction with the virtual object may differ in location, or time, or in other ways. The interaction component may be configured to change the virtual interface in accordance with a first instruction responsive to a first interaction with the virtual object. In some implementations, the interaction component may be configured to change the virtual interface in accordance with a second instruction responsive to a second interaction with the virtual object. The second interaction may differ from the first interaction. In some implementations, the first instruction may be associated with a first interaction type and the second instruction may be associated with a second interaction type. The first interaction type may differ from the second interaction type.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
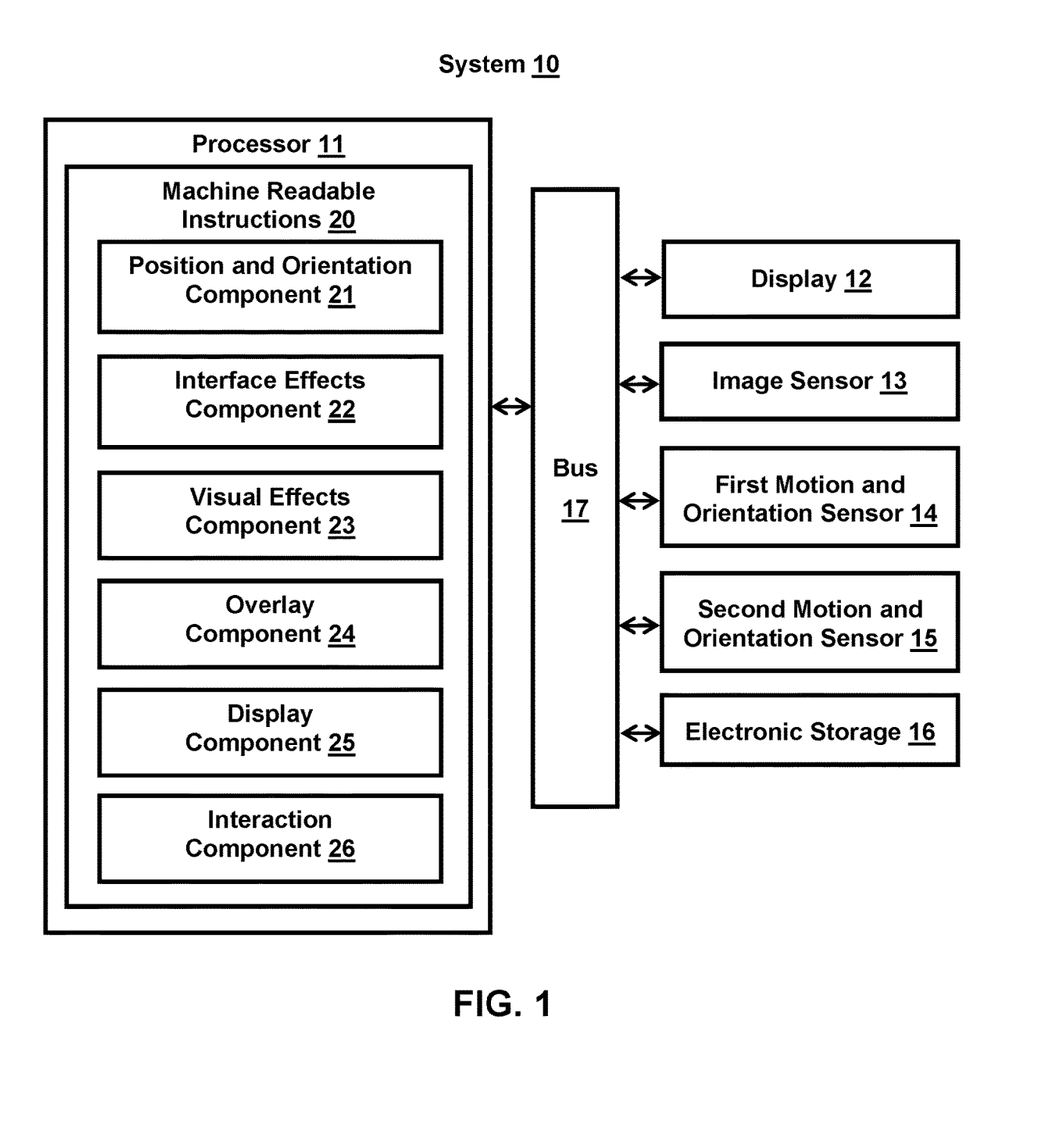
FIG. 1 illustrates a system for interacting with a virtual interface.

FIG. 1 illustrates a system 10 for interacting with a virtual interface. System 10 may include one or more of processor 11, display 12, image sensor 13, first motion and orientation sensor 14, electronic storage 16, bus 17, and/or other components. In some implementations, system 10 may include an object, and the object may be configured to carry (e.g., attach to, support, hold, and/or otherwise carry) one or more components of system 10. The object may include a handheld device (e.g., a hilt, a wand, etc.), a wearable device (e.g., smart watch, smart band, etc.), and/or other objects. In some implementations, the object may carry second motion and orientation sensor 15. The virtual interface may include a virtual object. The virtual object may correlate with an instruction to change the virtual interface. In some implementations, a virtual weapon may be used to interact with the virtual interface. The virtual weapon may include a virtual blade. The virtual weapon may be used to interact with the virtual interface by determining an overlay position and an overlay orientation for the virtual interface, determining an overlay position and an overlay orientation for the virtual blade, determining an interaction of the virtual blade with the virtual object correlating with an instruction to change the virtual interface, and changing the virtual interface in accordance with the instruction. In some implementations, system 10 may include a speaker. In some implementations, system 10 may include a haptic generator.

Display 12 may be configured to display an overlay image. In some implementations, display 12 may include one or more of a head-mounted display, an optical head-mounted display, a see-through display, an optical see-through display, a video see-through display, a visor, eyeglasses, sunglasses, a smartphone, a tablet, a mobile device, a projector, and/or other displays. In some implementations, processor 11 and image sensor 13 may be carried on display 12, and the field of view of image sensor 13 may be a function of the position and the orientation of display 12.

Image sensor 13 may be configured to generate visual output signals conveying visual information within the field of view of image sensor 13. Visual information may include one or more of an image, a video, and/or other visual information. When an object (e.g., a hilt, etc.) is within the field of view of image sensor 13, visual information may include one or more of an image, a video, and/or other visual information regarding the object. Image sensor 13 may include one or more of a charge-coupled device sensor, an active pixel sensor, a complementary metal-oxide semiconductor sensor, an N-type metal-oxide-semiconductor sensor, and/or other image sensors.

First motion and orientation sensor 14 may be carried by display 12. First motion and orientation sensor 14 may be configured to generate first motion and orientation output signals conveying motion and/or orientation information of display 12. Motion and/or orientation information of display 12 may characterize one or more motion and/or orientation of display 12. Motion of display 12 may include one or more of movement of display 12, change in position of display 12, and/or other motion of display 12 at a time or over a period of time. In some implementations, motion of display 12 may include distance between display 12 and an object (e.g., a hilt, etc.) at a time or over a period of time. Orientation of display 12 may include one or more of yaw, pitch, and/or roll of display 12, change in yaw, pitch, and/or roll of display 12, and/or other orientation of display 12 at a time or over a period of time. In some implementations, orientation of display 12 may include orientation of display 12 with respect to an object (e.g., a hilt, etc.) at a time or over a period of time.

In some implementations, first motion and orientation sensor 14 may include one or more of an inertial measurement unit, a magnetic position sensor, a radio-frequency position sensor, and/or other motion and orientation sensors. An inertial measurement unit may include one or more of accelerometers, gyroscopes, magnetometers, and/or other motion and orientation sensors. An inertial measurement unit may include one or more of 3-DOF inertial measurement units, 6-DOF inertial measurement units, 9-DOF inertial measurement units, and/or other inertial measurement units. In some implementations, first motion and orientation sensor 14 may include one or more distance sensors, such as infrared distance sensors, Lidar, ultrasonic distance sensors, and/or other distance sensors.

In some implementations, second motion and orientation sensor 15 may be carried by an object (e.g., a hilt, etc.). Second motion and orientation sensor 15 may be configured to generate second motion and orientation output signals conveying motion and/or orientation information of the object. Motion and/or orientation information of the object may characterize one or more motion and/or orientation of the object. Motion of the object may include one or more of movement of the object, change in position of the object, and/or other motion of the object at a time or over a period of time. In some implementations, motion of the object may include distance between display 12 and the object at a time or over a period of time. Orientation of the object may include one or more of yaw, pitch, and/or roll of the object, change in yaw, pitch, and/or roll of the object, and/or other orientation of the object at a time or over a period of time. In some implementations, orientation of the object may include orientation of the object with respect to display 12 at a time or over a period of time.

In some implementations, second motion and orientation sensor 15 may include one or more of an inertial measurement unit, a magnetic position sensor, a radio-frequency position sensor, and/or other motion and orientation sensors. An inertial measurement unit may include one or more of accelerometers, gyroscopes, magnetometers, and/or other motion and orientation sensors. An inertial measurement unit may include one or more of 3-DOF inertial measurement units, 6-DOF inertial measurement units, 9-DOF inertial measurement units, and/or other inertial measurement units. In some implementations, second motion and orientation sensor 15 may include one or more distance sensors, such as infrared distance sensors, Lidar, ultrasonic distance sensors, and/or other distance sensors.

In some implementations, a landmark may be carried by the object. The landmark may indicate a reference point for the object that facilitates determination of an overlay position and/or an overlay orientation for a visual effect that may augment the appearance of the object. In some implementations, the object may include a hilt and the visual effect may include a virtual blade. In some implementations, the landmark may include an augmented reality marker, a light emitting diode, the entire shape of the object, one or more parts of the object, and/or other landmarks. An augmented reality marker may be two-dimensional or three-dimensional. As a non-limiting example, an augmented reality marker may include one or more of a sticker, a label, a barcode, a quick response (QR) code, and/or other augmented reality markers. In some implementations, an object may include multiples types of landmarks. In some implementations, a landmark may be carried by the object as described in U.S. patent application Ser. No. 15/001,160, entitled "SYSTEMS AND METHODS FOR AUGMENTING AN APPEARANCE OF A HILT TO SIMULATE A BLADED WEAPON," filed Jan. 19, 2016, the foregoing being incorporated herein by reference in its entirety. Other types of landmarks are contemplated.

Electronic storage 16 may include electronic storage media that electronically stores information. Electronic storage 16 may store software algorithms, information determined by processor 11, information received remotely, and/or other information that enables system 10 to function properly. For example, electronic storage 16 may store visual information (as discussed elsewhere herein), information relating to virtual interfaces, information relating to virtual objects, information relating to visual effects, information relating to interactions with virtual objects, and/or other information.

Processor 11 may be configured to provide information processing capabilities in system 10. As such, processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. Processor 11 may be configured to execute one or more machine readable instructions 20 to facilitate the use of a virtual weapon to interact with a virtual interface. Machine readable instructions 20 may include one or more of position and orientation component 21, interface effects component 22, visual effects component 23, overlay component 24, display component 25, interaction component 26, and/or other components.

Position and orientation component 21 may be configured to determine an overlay position and/or an overlay orientation for a virtual interface based on the visual output signals and/or the first motion and orientation output signals. In some implementations, position and orientation component 21 may be configured to determine an overlay position and/or an overlay orientation for a virtual interface based on one or more visual markers. Visual marker may include things that facilitate determination of a position and/or an orientation of objects. For example, visual markers may include one or more of a label, a sticker, an augmented reality marker, a landmark, a light source, a part of an object, an entire shape of an object, and/or other visual markers. Position and orientation component 21 may detect one or more visual markers based on the visual output signals. Position and orientation component 21 may detect one or more visual makers and determine the overlay position and/or the overlay orientation for the virtual interface based on the position and/or the orientation of the visual marker(s). Position and orientation component 21 may include or retrieve information (for example, a database, etc.) that matches a detected visual marker to an overlay position and/or an overlay orientation for a virtual interface.

In some implementations, position and orientation component 21 may be configured to determine an overlay position and/or an overlay orientation for a virtual interface based on the visual output signals and based on the first motion and orientation output signals. For example, position and orientation component 21 may be configured to determine an overlay position and/or an overlay orientation for the virtual interface based on the visual output signals, and to adjust the overlay position and/or the overlay orientation for the virtual interface based on the first motion and orientation output signals. Such a determination of the overlay position and/or the overlay orientation for a virtual interface may increase the accuracy of the overlay position and/or the overlay orientation for the virtual interface.

In some implementations, position and orientation component 21 may be configured to determine an overlay position and/or an overlay orientation for the virtual interface based on a previously determined overlay position and/or a previously determined overlay orientation for the virtual interface, and based on the first motion and/or orientation output. For example, position and orientation component 21 may have determined an overlay position and/or an overlay orientation for the virtual interface, and may then determine a new overlay position and/or a new overlay orientation for the virtual interface based on the first motion and orientation output signals. Such a determination of the new overlay position and/or the new overlay orientation for a virtual interface may allow position and orientation component 21 to avoid any latency arising from determining an overlay position and/or an overlay orientation for a virtual interface based on the visual output signals.

In some implementations, position and orientation component 21 may be configured to determine an overlay position and/or an overlay orientation for a virtual interface based on the first motion and orientation output signals. Position and orientation component 21 may be configured to determine an overlay position and/or an overlay orientation for the virtual interface based on a certain distance from display 12 and/or a certain orientation with respect to display 12. For example, position and orientation component 21 may determine the overlay position and/or the overlay orientation for the virtual interface so that the virtual interface may be placed at a certain distance from and/or at a certain orientation with respect to display 12. When the position and/or the orientation of display 12 is changed, the overlay position and/or the overlay orientation for the virtual interface may be changed so that the virtual interface appears to remain in the same place or at the same angle.

In some implementations, position and orientation component 21 may be configured to determine an overlay position and/or an overlay orientation for a visual effect based on the visual output signals and/or the second motion and orientation output signals. In some implementations, the visual effect may include a virtual blade of the virtual weapon. For example, when a hilt is within the field of view of image sensor 13, position and orientation component 21 may be configured to determine an overlay position and/or an overlay orientation for the virtual blade based on the visual output signals conveying visual information within the field of view of image sensor 13.

In some implementations, position and orientation component 21 may detect an object based on the visual output signals. Position and orientation component 21 may determine a position and/or an orientation of the object. Position and orientation component 21 may include or retrieve information (for example, a database, etc.) that matches a detected object to an overlay position and/or an overlay orientation for a visual effect. For example, position and orientation component 21 may determine an overlay position of a virtual blade based on the position of a hilt, and/or an overlay orientation for the virtual blade based on the orientation of the hilt. Position and orientation component 21 may determine a position and/or an orientation of the object and/or an overlay position and/or an overlay orientation for the visual effect using systems and methods described in U.S. patent application Ser. No. 15/001,160, entitled "SYSTEMS AND METHODS FOR AUGMENTING AN APPEARANCE OF A HILT TO SIMULATE A BLADED WEAPON," filed Jan. 19, 2016, incorporated supra.

In some implementations, position and orientation component 21 may be configured to determine the overlay position and/or the overlay orientation for the visual effect based on a position and/or an orientation of a landmark. The landmark may be carried by the object. The landmark may indicate a reference point for the object that facilitates determination of an overlay position and/or an overlay orientation (yaw, pitch, and/or roll) of the visual effect. Position and orientation component 21 may include or retrieve information (for example, a database, etc.) that matches a detected landmark to an overlay position and/or an overlay orientation for a visual effect relative to the position and/or the orientation of the landmark. For example, position and orientation component 21 may determine the overlay position of a visual effect based on the position of a landmark, and/or the overlay orientation for the visual effect based on the orientation of the landmark. In some implementations, the overlay position and/or the overlay orientation for the visual effect may be determined using systems and methods described in U.S. patent application Ser. No. 15/001,160, entitled "SYSTEMS AND METHODS FOR AUGMENTING AN APPEARANCE OF A HILT TO SIMULATE A BLADED WEAPON," filed Jan. 19, 2016, incorporated supra.

When the object is not within the field of view of image sensor 13, position and orientation component 21 may be configured to determine the overlay position and/or the overlay orientation for the visual effect based on the second motion and orientation output signals. Position and orientation component 21 may determine changes in position and/or orientation of the object based on the second motion and orientation output signals. Position and orientation component 21 may determine the overlay position and/or the overlay orientation for the visual effect based on the changes in the position and/or the orientation of the object. In some implementations, position and orientation component 21 may determine the position and/or the orientation of the object with respect to display 12 based on systems and methods described in U.S. patent application Ser. No. 15/001,160, entitled "SYSTEMS AND METHODS FOR AUGMENTING AN APPEARANCE OF A HILT TO SIMULATE A BLADED WEAPON," filed Jan. 19, 2016, incorporated supra.

In some implementations, position and orientation component 21 may be configured to determine an overlay position and/or an overlay orientation for a visual effect based on the visual output signals and based on the second motion and orientation output signals. For example, position and orientation component 21 may be configured to determine an overlay position and/or an overlay orientation for the visual effect based on the visual output signals, and to adjust the overlay position and/or the overlay orientation for the visual effect based on the second motion and orientation output signals. Such a determination of the overlay position and/or the overlay orientation for a visual effect may increase the accuracy of the overlay position and/or the overlay orientation for the visual effect.

In some implementations, position and orientation component 21 may be configured to determine an overlay position and/or an overlay orientation for visual effect based on a previously determined overlay position and/or a previously determined overlay orientation for the visual effect, and based on the second motion and/or orientation output. For example, position and orientation component 21 may have determined an overlay position and/or an overlay orientation for the visual effect, and may then determine a new overlay position and/or a new overlay orientation for the visual effect based on the second motion and orientation output signals. Such a determination of the new overlay position and/or the new overlay orientation for a visual effect may allow position and orientation component 21 to avoid any latency arising from determining an overlay position and/or an overlay orientation for a visual effect based on the visual output signals.

In some implementations, position and orientation component 21 may be configured to determine changes in an overlay position and/or an overlay orientation for a visual effect. Changes in an overlay position and/or an overlay orientation for a visual effect may include information regarding changes in an overlay position and/or an overlay orientation for a visual effect at a time, over a period of time, at a location, or over a range of locations. For example, changes in an overlay position and/or an overlay orientation for a visual effect may include one or more information regarding change in position, direction of position change, speed of position change, acceleration of position change, change in orientation, direction of orientation change, speed of orientation change, acceleration of orientation change, and/or other information regarding changes in an overlay position and/or an overlay orientation for the visual effect.

In some implementations, position and orientation component 21 may determine changes in an overlay position and/or an overlay orientation for a visual effect based on the visual output signals and/or the second motion and orientation signals. For example, when the object is within the field of view of image sensor 13, position and orientation component 21 may determine changes in an overlay position and/or an overlay orientation for a visual effect based on the visual output signals. As another example, when the object is not within the field of view of image sensor 13, position and orientation component 21 may determine changes in an overlay position and/or an overlay orientation for the visual effect based on the second motion and orientation output signals.

In some implementations, position and orientation component 21 may determine changes in an overlay position and/or an overlay orientation for a visual effect based on the visual output signals and based on the second motion and orientation output signals. In some implementations, position and orientation component 21 may determine changes in an overlay position and/or an overlay orientation for the visual effect based on a previously determined overlay position and/or a previously determined overlay orientation for the visual effect, and based on the second motion and/or orientation output.

Interface effects component 22 may be configured to select a virtual interface. A virtual interface may include one or more visual effects. A visual effect may refer to one or more information that may be observed visually. A visual effect may be static or dynamic, and may be visually observable at a time, over a period of time, at a location, or over a range of locations. A visual effect may include one or more of an image, a video, and/or other visual effects.

A virtual interface may include one or more virtual objects. A virtual object may correlate with an instruction to change the virtual interface. A virtual object may correlate with more than one instructions to change the virtual interface. An instruction to change the virtual interface may include one or more commands to change the interface at a time or over a period of time. For example, an instruction to change the virtual interface may include one or more commands to provide more information regarding the virtual object, change the virtual interface into another virtual interface, exit the virtual interface, and/or other commands. Other types of instructions and commands are contemplated.

Figure 2:
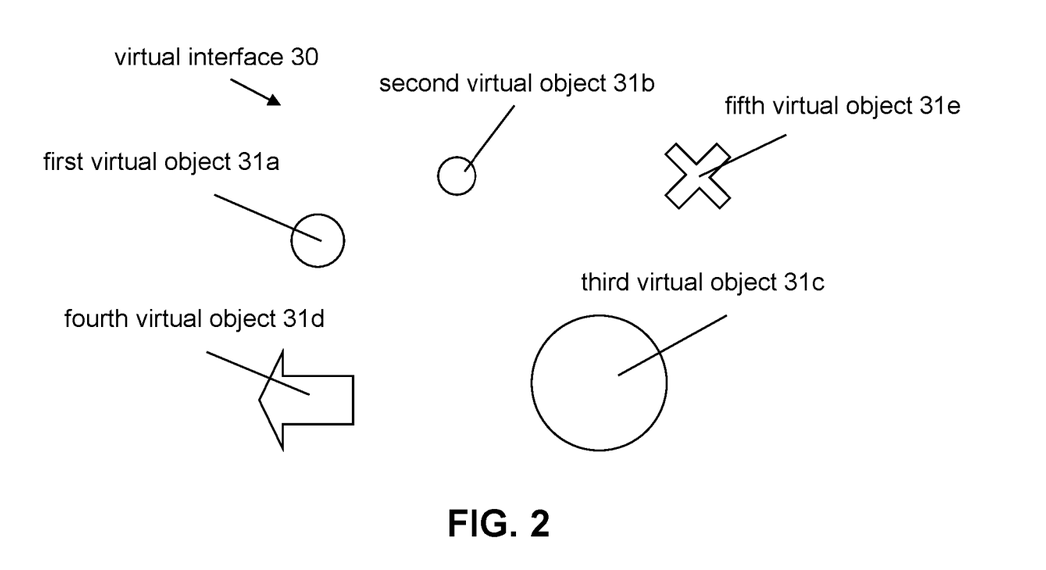
FIG. 2 illustrates an example of a virtual interface.

For example, FIG. 2 illustrates an examples of virtual interface 30. Virtual interface 30 appears as a view of planets from space. Other appearances of virtual interface are contemplated. Virtual interface 30 includes virtual objects 31*a*-31*e*. First virtual object 31*a*, second virtual object 31*b*, and third virtual object 31*c* appear as planets. Fourth virtual object 31 appears as a back arrow. Fifth virtual object 31*e* appears as an "X" symbol. Other appearances of virtual objects are contemplated.

Virtual objects 31*a*-31*e* may correlate with different instructions to change virtual interface 30. For example, first virtual object 31*a* may correlate with an instruction to change virtual interface 30 to provide more information regarding first virtual object 31*a*. Second virtual object 31*b* may correlate with an instruction to change virtual interface 30 to provide more information regarding second virtual object 31*b*. Third virtual object 31*c* may correlate with an instruction to change virtual interface 30 into another virtual interface. For example, virtual interface 30 may be changed into a virtual interface relating to third virtual object 31*c*. A virtual interface relating to third virtual object 31*c* may include a virtual interface including more information about third virtual object 31*c*, a virtual interface in which third virtual object 31*c* is the focus of the virtual interface, a virtual interface in which an area of third virtual object 31*c* is displayed, or other virtual interface relating to third virtual object 31*c*. Fourth virtual object 31*d* may correlate with an instruction to return to a prior virtual interface. Fifth virtual interface may correlate with an instruction to exit virtual interface 30. Other correlations and other instructions are contemplated.

Figure 3:
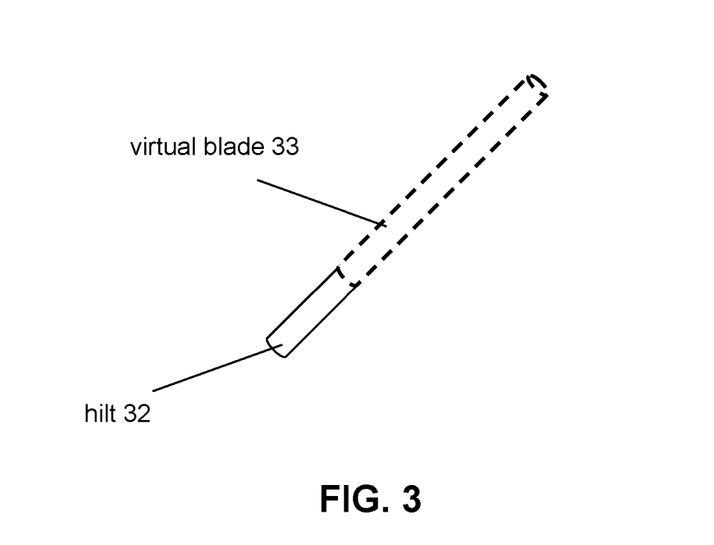
FIG. 3 illustrates an example of a virtual blade augmenting the appearance of a hilt.

In some implementations, visual effects component 23 may be configured to select a visual effect (e.g., a virtual blade, etc.). A visual effect may refer to one or more information that may be observed visually. A visual effect may be static or dynamic, and may be visually observable at a time, over a period of time, at a location, or over a range of locations. A visual effect may include one or more of an image, a video, and/or other visual effects. For example, a visual effect may include a virtual blade of a virtual weapon. A virtual blade may be a blade of a real weapon, such as a broadsword, an axe, or a katana, or a fictional weapon, such as a lightsaber. For example, FIG. 3 illustrates an example of virtual blade 33 augmenting an appearance of hilt 32. In some implementations, visual effects component 23 may be configured to select the visual effect based on a user input received through an input device. An input device may refer to a device that allows a user to input information. For example, an input device may include a key entry device, a touch entry device, an imaging device, a sound device, and/or other input devices. A user input may refer to one or more information provided by a user through an input device.

A key entry device may include a device that allows a user to provide one or more user inputs by typing one or more of characters, numbers, and/or other symbols. A key entry device may include a separate device or a part of another device. For example, a key entry device may include a keyboard/button coupled to processor 11. As another example, a key entry device may include a mobile device coupled to processor 11. A user may provide one or more user inputs by typing one or more information. For example, a user may provide one or more user inputs by typing one or more of a type, shape, size, color, and/or other information about the visual effect.

A touch entry device may include a device that allows a user to provide user inputs by touching a user interface of the touch entry device. A touch entry device may include a separate device or a part of another device. For example, a touch entry device may include a touch screen coupled to processor 11. As another example, a touch entry device may include a mobile device coupled to processor 11. A user may provide one or more user inputs by touching one or more portions of the touch entry device corresponding to one or more information. For example, a user may provide one or more user inputs by touching one or more portions of the touch entry device corresponding to one or more of a type, shape, size, color, and/or other information about the visual effect.

An imaging device may include a device that allows a user to provide user inputs by using an image sensor of the imaging device. An imaging device may include a separate device or a part of another device. For example, an imaging device may include an image sensor coupled to processor 11. As a non-limiting example, an imaging device may include image sensor 13. As another example, an imaging device may include a mobile device coupled to processor 11. A user may provide one or more user inputs by directing the field of view of the imaging device to objects that include information. For example, a user may provide one or more user inputs by directing the field of view of the imaging device to a landmark, an augmented reality marker, and/or other objects that include one or more of a type, shape, size, color, and/or other information about the visual effect.

A sound device may include a device that allows a user to provide user inputs through voice and/or sounds. A sound device may include a separate device or part of another device. For example, a sound device may include a microphone coupled to processor 11. As another example, a sound device may include a mobile device coupled to processor 11. A user may provide one or more user input by speaking one or more information. For example, a user may provide one or more user inputs by speaking one or more of a type, shape, size, color, and/or other information about the visual effect.

In some implementations, visual effects component 23 may be configured to select the visual effect based on a landmark. Visual effects component 23 may include or retrieve information (for example, a database, etc.) that matches a landmark to a particular visual effect. In some implementations, the visual effect may be selected as described in U.S. patent application Ser. No. 15/001,160, entitled "SYSTEMS AND METHODS FOR AUGMENTING AN APPEARANCE OF A HILT TO SIMULATE A BLADED WEAPON," filed Jan. 19, 2016, incorporated supra.

Figure 4:
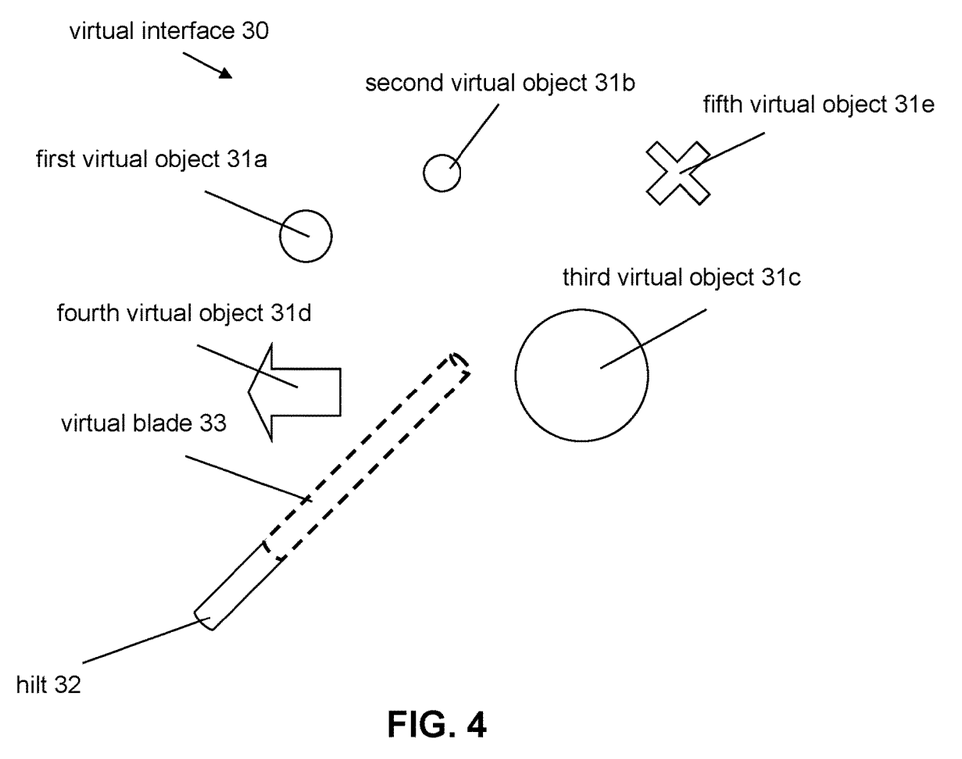
FIG. 4 illustrates an example of a virtual interface and a virtual weapon.

Overlay component 24 may be configured to determine an overlay image. The overlay image may include a virtual interface determined by interface effects component 22. The virtual interface may be placed within the overlay image according to the overlay position and/or the overlay orientation for the virtual interface. The virtual interface may include a virtual object. In some implementations, the overlay image may include a visual effect (e.g., a virtual blade of a virtual weapon, etc.) determined by visual effects component 23. The visual effect may be placed within the overlay image according to the overlay position and/or the overlay orientation for the visual effect. For example, FIG. 4 illustrates an example of virtual interface 30 and virtual blade 33 placed within an overlay image.

The overlay position and/or the overlay orientation for the virtual interface may change how the virtual interface (including the virtual object(s)) appears within the overlay image. For example, the overlay position and/or the overlay orientation for the virtual interface may change one or more of the position, the size, the shape, the tilt, the rotation, and/or other appearances of the virtual interface (including the virtual object(s)). The overlay position and/or the overlay orientation for the visual effect may change how the visual effect appears within the overlay image. For example, the overlay position and/or the overlay orientation for a virtual blade may change one or more of the position, the size, the shape, the tilt, the rotation, and/or other appearances of the virtual blade.

Display component 25 may be configured to effectuate displaying of an overlay image on display 12. The displaying may be effectuated so that the virtual object appears as a part of the virtual interface. In some implementations, the displaying may be effectuated so that a virtual blade appears to be attached to a hilt. In some implementations, display component 25 may be configured to effectuate displaying of an overlay image within one or more of an image, a video, and/or other visual information based on the visual output signals generated by image sensor 13.

In some implementations, display component 25 may be configured to effectuate displaying of an overlay image on display 12, which allows light to be passed through display 12 in portions in which the overlay image does not contain the virtual interface or the visual effect. For example, display 12 may include one or more of an optical head-mounted display and a user of display 12 may see light from the real world as well as the overlay image. In some implementations, display component 25 may be configured to change the transparency of one or more portions of display 12. For example, display component 25 may change the transparency of one or more portions of display 12 corresponding to the visual effect and/or the virtual interface to block light from the real world passing through display 12.

Position and orientation component 21 may be configured to determine an interaction with the virtual object. In some implementations, position and orientation component 21 may be configured to determine an interaction of a user with the virtual object based on a user interaction. A user may interact with the virtual object directly or indirectly. For example, a user may interact with a virtual object by touching the virtual object, swiping the virtual object, grabbing the virtual object, expanding the virtual object, shrinking the virtual object, poking the virtual object, vocally stating a command associated with the virtual object (e.g., vocally stating "enter planet A," etc.), pointing to the virtual object while inputting another user input (e.g., point to a virtual object while vocally stating "activate," etc.), and/or other interactions. In some implementations, a user's interaction with the virtual object may be determined based on the visual output signals.

A user may interact with the virtual object through a part of the user's body part (e.g., finger, hand, etc.) or through another device (e.g., wand, glove, etc.). For example, a user may wear a smart band on a wrist and interact with the virtual object by moving the wrist. The user's movement of the wrist may be determined based on the visual output signals and/or through communication with the smart band. As another example, a user may interact with the virtual object by moving the user's head (e.g., nodding, shaking, and/or tilting the head up, down, left, and/or right) and/or eye(s) (e.g., changing the gaze direction of eye(s)).

In some implementations, position and orientation component 21 may be configured to determine an interaction of a visual effect (e.g., a virtual blade, etc.) with the virtual object based on the overlay position and/or the overlay orientation for the visual effect and the overlay position and/or the overlay orientation for the virtual interface. Position and orientation component 21 may be configured to determine when the visual effect interacts with the virtual object. An interaction of the visual effect with the virtual object may refer to direct or indirect ways in which the visual effect may act upon the virtual object. For example, a visual effect may include a virtual blade, and an interaction of the virtual blade with the virtual object may include the virtual blade touching the virtual object, the virtual blade slashing the virtual object, the virtual blade stabbing the virtual object, the virtual blade pointing to the virtual object, the virtual blade pointing to the virtual object while a user input is detected, and/or other interactions. Other types of interactions with the virtual object are contemplated.

Interaction component 26 may be configured to, responsive to an interaction with the virtual object, change the virtual interface in accordance with an instruction. For example, in FIG. 5A, virtual blade 33 may be slashed across third virtual object 31*c*. Third virtual object 31*c* may correlate with an instruction to change virtual interface 30 into another virtual interface. For example, responsive to virtual blade 33 slashing across third virtual object 31*c*, interaction component 26 may change virtual interface 30 into another virtual interface relating to third virtual object 31*c*. As another example, the virtual interface/virtual object may include a list of items, and in response to the user's head tilting up, down, left, or right, or the gaze direction of the user's eye(s) moving up, down, left or right, interaction component 26 may change virtual interface 30 to display additional items (simulating the list being scrolled up, down, left or right) or change the selection of item(s) on the list. Other changes in the virtual interface are contemplated.

In some implementations, a virtual object may correlate with multiple instructions to change the virtual interface, and interaction component 26 may be configured to select a particular instruction based on the interaction. For example, interaction component 26 may be configured to select a particular instruction based on the interaction of the visual effect (e.g., a virtual blade, etc.), another device (e.g., wand, etc.) or a user (e.g., through hand gestures, head movement, etc.) with the virtual object. The interaction with the virtual object may differ in location (e.g., the virtual blade, wand or user's hand/head interacting with different parts of the virtual object), speed (e.g., the virtual blade, wand, or user's hand/head interacting with the virtual object at fast or slow speed), or time (e.g., the virtual blade, smart band, or user's hand/head interacting with the virtual object at different times), or in other ways.

For example, third virtual object 31*c* may correlate with two different instructions to change virtual interface 30. First instruction may include a command to change virtual interface 30 into another virtual interface relating to third virtual object 31*c*. Second instruction may include a command to provide more information regarding a part of third virtual object 31*c*.

Figure 5A:
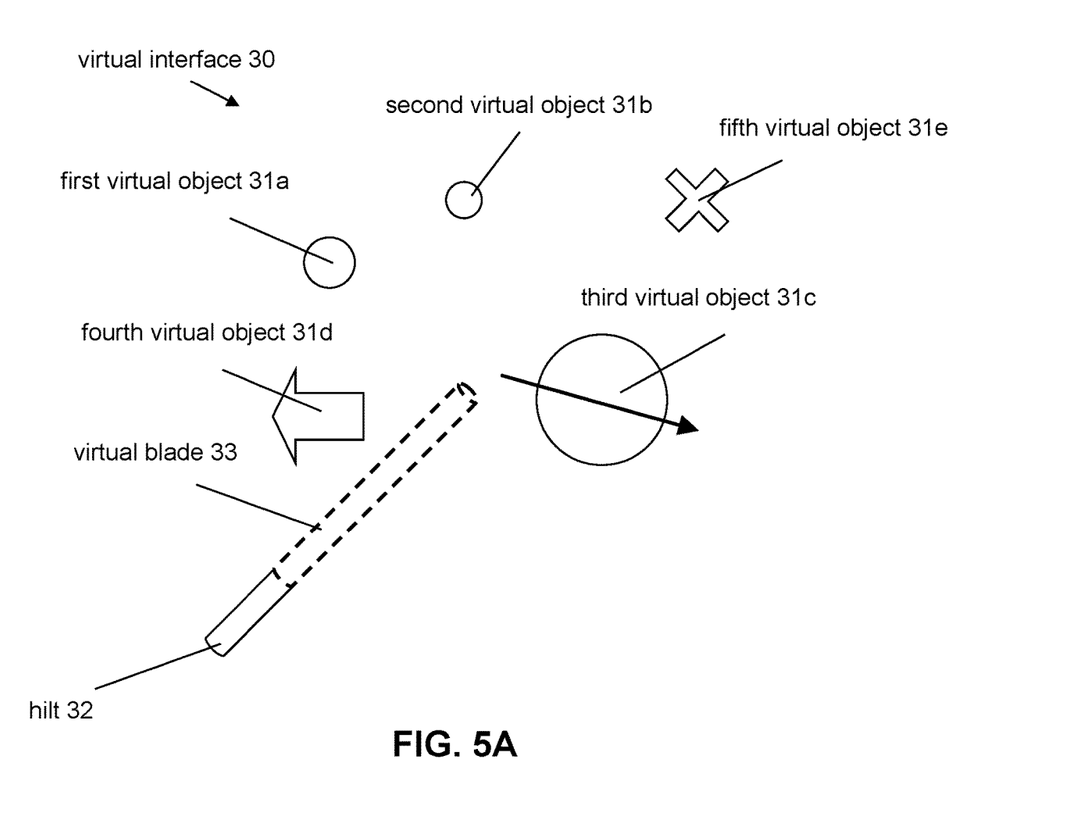
FIGS. 5A-5C illustrate examples of a virtual blade interacting with a virtual object.

Based on virtual blade 33 slashing across the middle of third virtual object 31*c* (as shown in FIG. 5A), interaction component 26 may change virtual interface 30 in accordance with the first instruction. For example, interaction component 26 may change virtual interface 30 into another virtual interface relating to third virtual object 31*c*.

Figure 5B:
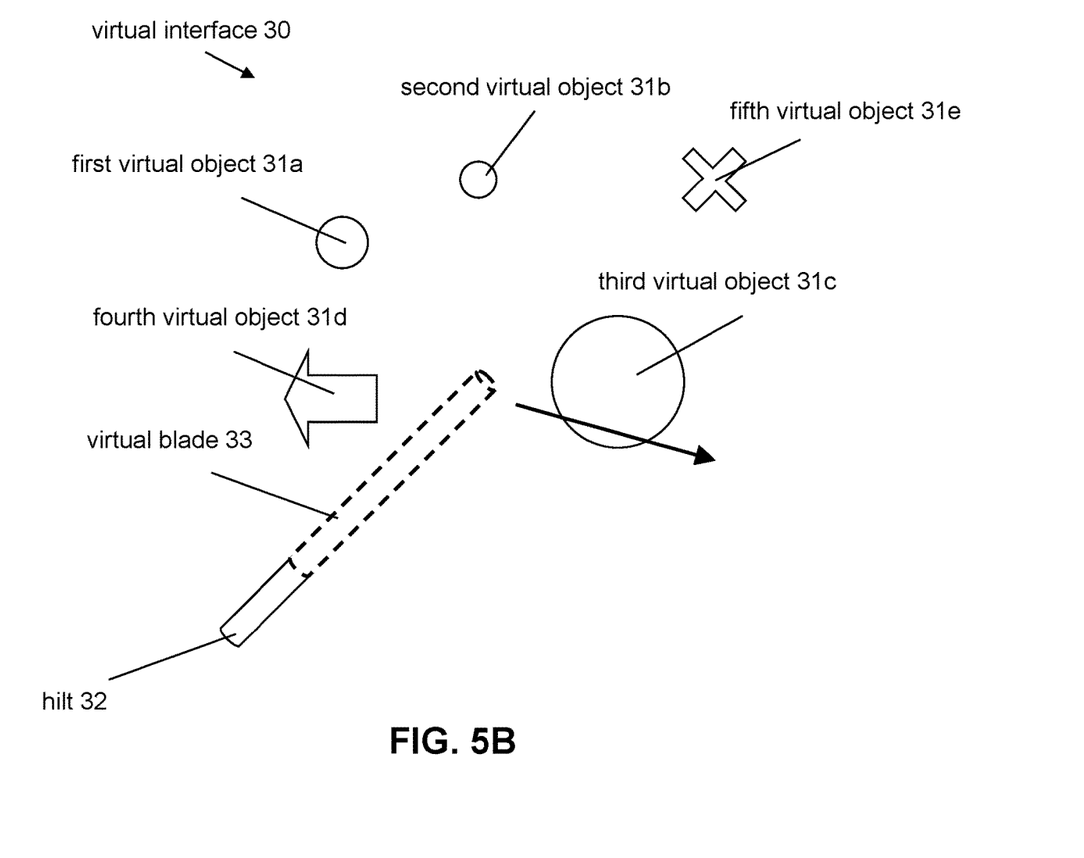

Based on virtual blade 33 slashing across the lower section of third virtual object 31*c* (as shown in FIG. 5B), interaction component 26 may change virtual interface 30 in accordance with the second instruction. For example, interaction component 26 may change virtual interface 30 to provide more information regarding the lower section of third virtual object 31*c*. Other interactions of the visual effect with the virtual object and other instructions are contemplated.

In some implementations, a virtual object may correlate with multiple instructions to change the virtual interface, and interaction component 26 may be configured to select a particular instruction based on an interaction type. For example, interaction component 26 may be configured to select a particular instruction based on an interaction type of the virtual blade/wand/user's hand with the virtual object. An interaction type of the virtual blade/wand/user's hand with the virtual object may refer to different types of ways in which the virtual blade/wand/user's hand may directly or indirectly act upon the virtual object. For example, different types of interaction of the virtual blade/wand/user's hand with the virtual object may include the virtual blade/wand/user's hand touching the virtual object, the virtual blade/wand/user's hand slashing the virtual object, the virtual blade/wand/user's hand stabbing the virtual object, the virtual blade/wand/user's hand pointing to the virtual object, the virtual blade/wand/user's hand/head/eyes(s) pointing to the virtual object while a user input (e.g., voice command, button press, etc.) is detected, and/or other type of interactions.

For example, third virtual object 31*c* may correlate with two different instructions to change virtual interface 30. First instruction may include a command to change virtual interface 30 into another virtual interface relating to third virtual object 31*c*. Second instruction may include a command to provide more information regarding third virtual object 31*c*.

Based on virtual blade 33 slashing across third virtual object 31*c* (as shown in FIG. 5A and FIG. 5B), interaction component 26 may change virtual interface 30 in accordance with the first instruction. For example, interaction component 26 may change virtual interface 30 into another virtual interface relating to third virtual object 31*c*.

Figure 5C:
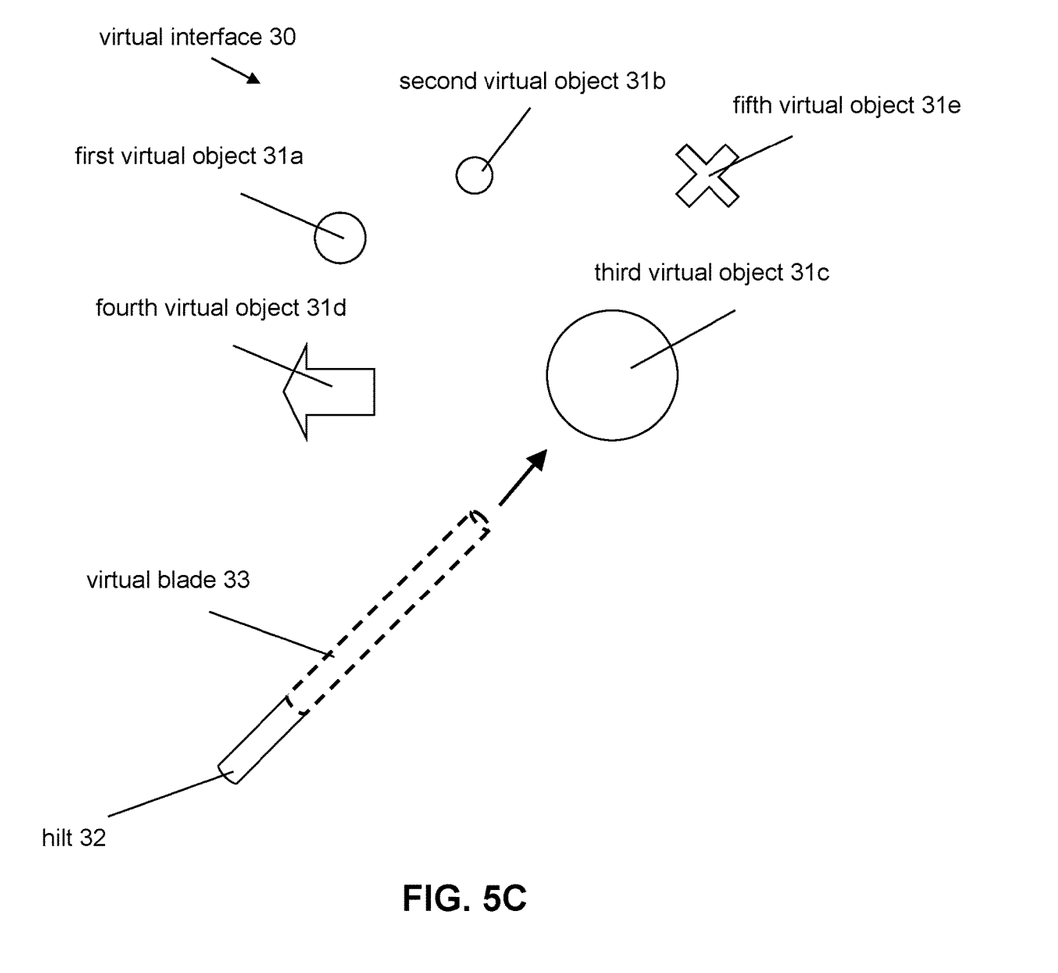

Based on virtual blade 33 pointing to virtual object 31*c* or virtual blade 33 pointing to virtual object 31*c* while a user input is detected (as shown in FIG. 5C), interaction component 26 may change virtual interface 30 in accordance with the second instruction. For example, interaction component 26 may change virtual interface 30 to provide more information regarding third virtual object 31*c*. Other types of interactions of the visual effect with the virtual object and other instructions are contemplated.

In some implementations, a virtual object may correlate with multiple instructions to change the virtual interface, and interaction component 26 may be configured to select a particular instruction based on an interaction with the virtual object and an interaction type. For example, interaction component 26 may be configured to change the virtual interface in accordance with different instructions based on where the virtual blade/wand/user's hand interacts with the virtual object and the type of interaction of the virtual blade/wand/user's hand with the virtual object.

In some implementations, system 10 may include a speaker. Visual effects component 23 may be configured to effectuate operation of the speaker. The operation of the speaker may be effectuated in response to changes in the overlay position and/or the overlay orientation for the visual effect based one or more of the visual output signals and/or the second motion and orientation output signals. The speaker may be operated to provide one or more audio effects. An audio effect may refer to one or more information that may be observed audibly. An audio effect may be static or dynamic, and may be audibly observable at a time, over a period of time, at a location, or over a range of locations. An audio effect may include one or more of a sound, a music, a word, a sentence, and/or other audio effect.

For example, visual effects component 23 may have selected a blade of a lightsaber as the visual effect for a hilt. When the virtual blade is motionless, visual effects component 23 may effectuate operation of the speaker to produce a buzzing/humming sound of a motionless lightsaber. When the virtual blade is moving, visual effects component 23 may effectuate operation of the speaker to produce a "wah" sound of a moving lightsaber. Visual effects component 23 may be configured to change the intensity and/or length of the sound based on the movement of the virtual blade.

In some implementations, visual effects component 23 may be configured to effectuate operation of the speaker based on the visual effect touching the virtual interface. For example, in FIG. 5A, visual effects component 23 may effectuate the operation of the speaker to produce a cutting sound when virtual blade 33 is slashed across third virtual object 31c. Other types of audio effects are contemplated.

In some implementations, system 10 may include a haptic generator. Visual effects component 23 may be configured to effectuate operation of the haptic generator in response to changes in the overlay position and/or the overlay orientation for the visual effect based one or more of the visual output signals and/or the second motion and orientation output signals. The haptic generator may be operated to provide one or more haptic effects. A haptic effect may refer to one or more information that may be observed haptically. A haptic effect may be static or dynamic, and may be haptically observable at a time, over a period of time, at a location, or over a range of locations. A haptic effect may include one or more of a vibration, a motion, a temperature, and/or other haptic effects.

For example, visual effects component 23 may have selected a blade of a lightsaber as the visual effect for a hilt. Visual effects component 23 may effectuate operation of the haptic generator to produce a light vibration of a lightsaber. Visual effects component 23 may be configured to change the intensity and/or length of the vibration based on the movement of the virtual blade.

In some implementations, visual effects component 23 may be configured to effectuate operation of the haptic generator based on the visual effect touching the virtual interface. For example, in FIG. 5B, visual effects component 23 may effectuate the operation of the haptic generator to produce vibration and/or heat when virtual blade 33 is slashed across third virtual object 31c. Other types of haptic effects are contemplated.

Although processor 11, display 12, image sensor 13, first motion and orientation sensor 14, second motion and orientation sensor 15, and electronic storage 16 are shown to be connected to a bus 17 in FIG. 1, any communication medium may be used to facilitate interaction between any components of system 10. One or more components of system 10 may communicate with each other through hard-wired communication, wireless communication, or both. For example, processor 11 may wirelessly communicate with first motion and orientation sensor 14. By way of non-limiting example, wireless communication may include one or more of radio communication, Bluetooth communication, Wi-Fi communication, cellular communication, infrared communication, or other wireless communication. Other types of communications are contemplated by the present disclosure.

Although processor 11 is shown in FIG. 1 as a single entity, this is for illustrative purposes only. In some implementations, processor 11 may comprise a plurality of processing units. These processing units may be physically located within the same device, or processor 11 may represent processing functionality of a plurality of devices operating in coordination.

Processor 11 may be configured to execute one or more of position and orientation component 21, interface effects component 22, visual effects component 23, overlay component 24, display component 25, interaction component 26, and/or other components by software; hardware; firmware; some combination of software, hardware, and/or firmware; and/or other mechanisms for configuring processing capabilities on processor 11.

It should be appreciated that although position and orientation component 21, interface component 22, visual effects component 23, overlay component 24, display component 25, and interaction component 26 are illustrated in FIG. 1 as being co-located within a single processing unit, in implementations in which processor 11 comprises multiple processing units, one or more of position and orientation component 21, interface component 22, visual effects component 23, overlay component 24, display component 25 and/or interaction component 26 may be located remotely from the other computer program components.

The description of the functionality provided by the different computer program components 21, 22, 23, 24, 25, and/or 26 described herein is for illustrative purposes, and is not intended to be limiting, as any of computer program components 20, 21, 22, 23, 24, 25, and/or 26 may provide more or less functionality than is described. For example, one or more of computer program components 20, 21, 22, 23, 24, 25, and/or 26 may be eliminated, and some or all of its functionality may be provided by other computer program components 20, 21, 22, 23, 24, 25, and/or 26. As another example, processor 11 may be configured to execute one or more additional computer program components that may perform some or all of the functionality attributed to one or more of computer program components 20, 21, 22, 23, 24, 25, and/or 26.

Although display 12 is depicted in FIG. 1 as a single element, this is not intended to be limiting. Display 12 may include one or more displays in one or more locations.

Although image sensor 13 is depicted in FIG. 1 as a single element, this is not intended to be limiting. Image sensor 13 may include one or more image sensors in one or more locations.

Although first motion and orientation sensor 14 is depicted in FIG. 1 as single elements, this is not intended to be limiting. First motion and orientation sensor 14 may include one or more motion and orientation sensors in one or more locations.

Although second motion and orientation sensor 15 is depicted in FIG. 1 as single elements, this is not intended to be limiting. Second motion and orientation sensor 15 may include one or more gyroscopes in one or more locations.

The electronic storage media of electronic storage 16 may be provided integrally (i.e., substantially non-removable) with one or more components of system 10 and/or removable storage that is connectable to one or more components of system 10 via, for example, a port (e.g., a USB port, a Firewire port, etc.) or a drive (e.g., a disk drive, etc.). Electronic storage 16 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. Electronic storage 16 may be a separate component within system 10, or electronic storage 16 may be provided integrally with one or more other components of system 10 (e.g., processor 11). Although electronic storage 16 is shown in FIG. 1 as a single entity, this is for illustrative purposes only. In some implementations, electronic storage 16 may comprise a plurality of storage units. These storage units may be physically located within the same device, or electronic storage 16 may represent storage functionality of a plurality of devices operating in coordination.

Figure 6:
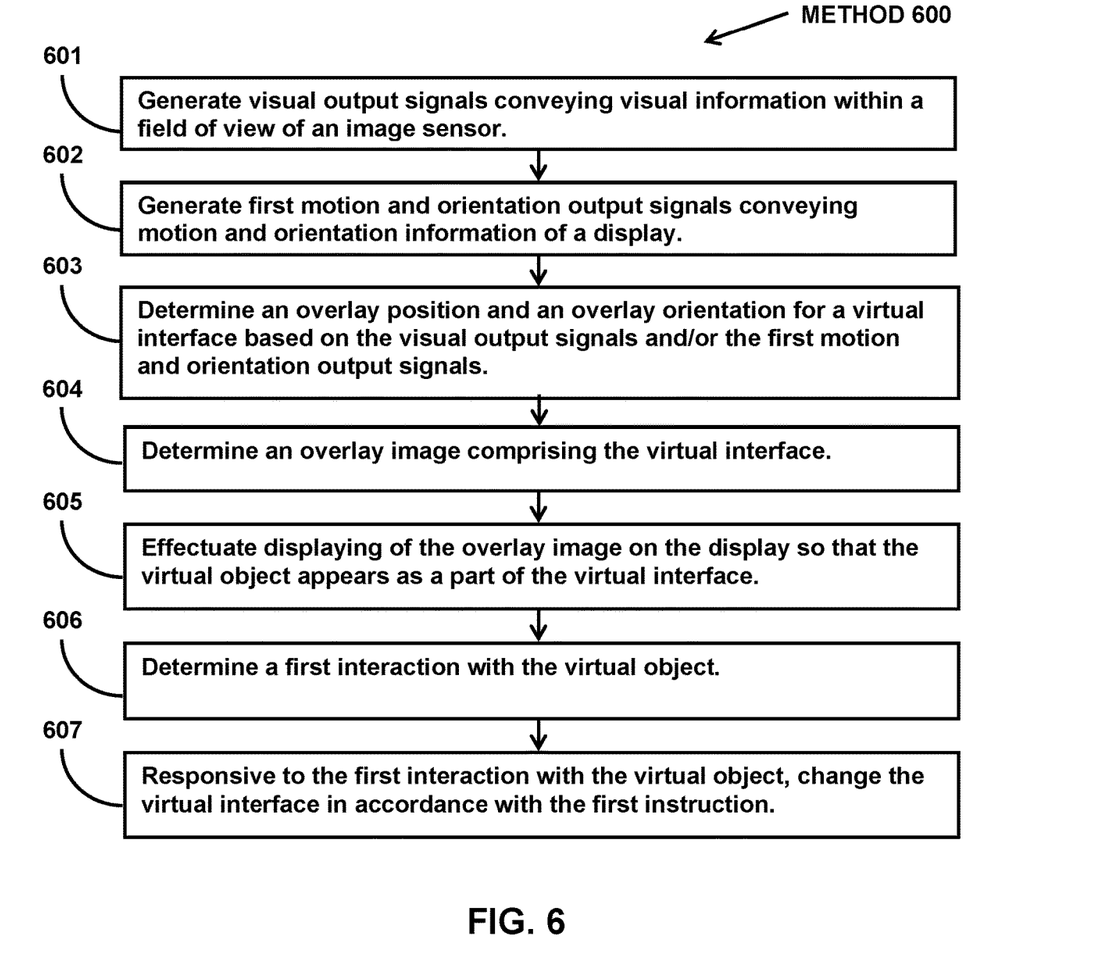
FIG. 6 illustrates a method for interacting with a virtual interface.

FIG. 6 illustrates method 600 for augmenting an appearance of an object. The operations of method 600 presented below are intended to be illustrative. In some implementations, method 600 may be accomplished with one or more additional operations not described, and/or without one or more of the operations discussed. In some implementations, two or more of the operations may occur substantially simultaneously.

In some implementations, method 600 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operations of method 600 in response to instructions stored electronically on one or more electronic storage mediums. The one or more processing devices may include one or more devices configured through hardware, firmware, and/or software to be specifically designed for execution of one or more of the operations of method 600.

Referring to FIG. 6 and method 600, at operation 601, visual output signals conveying visual information within a field of view of an image sensor may be generated. Visual information may include one or more of an image, a video, and/or other visual information. In some implementations, operation 601 may be performed by one or more sensors the same as or similar to image sensor 13 (shown in FIG. 1 and described herein).

At operation 602, first motion and orientation output signals conveying motion and orientation information of a display may be generated. In some implementations, operation 602 may be performed by one or more sensors the same as or similar to first motion and orientation sensor 14 (shown in FIG. 1 and described herein).

At operation 603, an overlay position and an overlay orientation for a virtual interface may be determined based on the visual output signals and/or the first motion and orientation output signals. The virtual interface may include a virtual object correlating with a first instruction to change the virtual interface. In some implementations, operation 603 may be performed by a processor component the same as or similar to position and orientation component 21 (shown in FIG. 1 and described herein).

At operation 604, an overlay image comprising the virtual interface may be determined. The virtual interface may be placed within the overly image according to the overlay position and the overlay orientation for the virtual interface. In some implementations, operation 604 may be performed by a processor component the same as or similar to overlay component 24 (shown in FIG. 1 and described herein).

At operation 605, displaying of the overlay image on a display may be effectuated so that the virtual object appears as a part of the virtual interface. In some implementations, operation 605 may be performed by a processor component the same as or similar to display component 25 (shown in FIG. 1 and described herein).

At operation 606, a first interaction with the virtual object may be determined. In some implementations, operation 606 may be performed by a processor component the same as or similar to position and orientation component 21 (shown in FIG. 1 and described herein).

At operation 607, responsive to the first interaction with the virtual object, the virtual interface may be changed in accordance with the first instruction. In some implementations, operation 607 may be performed by a processor component the same as or similar to interaction component 26 (shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system for interacting with a virtual interface, the system comprising:

a head-mounted display configured to display an overlay image depicting a virtual interface and a virtual blade of a virtual weapon, the displaying of the overlay image by the display creating an augmented reality environment such that the virtual interface and the virtual blade are perceived as being present in a real-world environment;

an image sensor configured to generate visual output signals conveying visual information within a field of view of the image sensor;

a first motion and orientation sensor mounted on the display, the first motion and orientation sensor configured to generate first motion and orientation output signals conveying motion and orientation information of the display; and one or more processors configured by machine readable instructions to:
- determine an overlay position and an overlay orientation for the virtual interface based on the visual output signals, the first motion and orientation output signals, or a combination thereof, the virtual interface including a virtual object and a second virtual object, wherein interactions with the virtual object and the second virtual object cause one or more changes to the virtual interface;
- determine the overlay image comprising the virtual interface, wherein the virtual interface is placed within the overlay image according to the overlay position and the overlay orientation for the virtual interface;
- determine a blade overlay position and a blade overlay orientation for the virtual blade based on the visual output signals, wherein the virtual blade is placed within the overlay image according to the blade overlay position and the blade overlay orientation for the virtual blade;
- effectuate displaying of the overlay image on the display such that the virtual object and the second virtual object appear as a part of the virtual interface, and the virtual blade appears to be attached to a physical hilt present in the real-world environment; and
- determine occurrences of the interactions with the virtual object and the second virtual object, and change the virtual interface based on individual ones of the interactions, the interactions with the virtual object and the second virtual object being based on the blade overlay position and the blade overlay orientation for the virtual blade, and the overlay position and the overlay orientation for the virtual interface, such that:
  - responsive to determining an occurrence of a first interaction with the virtual object, change the virtual interface in accordance with a first instruction to change the virtual interface, wherein the first instruction to change the virtual interface includes a command to provide more information regarding the virtual object;
  - responsive to determining an occurrence of a second interaction with the virtual object, change the virtual interface in accordance with a second instruction to change the virtual interface, wherein the second instruction to change the virtual interface includes a command to change the virtual interface into another virtual interface;
  - responsive to determining an occurrence of the first interaction with the second virtual object, change the virtual interface in accordance with a third instruction to change the virtual interface, wherein the third instruction to change the virtual interface includes a command to exit the virtual interface;
  - responsive to determining an occurrence of the second interaction with the second virtual object, change the virtual interface in accordance with a fourth instruction to change the virtual interface; and
  - wherein the first interaction includes a slashing interaction, and the second interaction include a stabbing interaction.

2. The system of claim 1, wherein the first instruction is associated with a first interaction type and the second instruction is associated with a second interaction type, the first interaction type differing from the second interaction type, and the one or more processors are further configured by machine readable instructions to determine an interaction type with the virtual object.

3. The system of claim 2, wherein the first interaction type includes the slashing interaction and the second interaction type includes the stabbing interaction.

4. The system of claim 1, further comprising:
the hilt; and
a second motion and orientation sensor mounted on the hilt, the second motion and orientation sensor configured to generate second motion and orientation output signals conveying motion and orientation information of the hilt.

5. The system of claim 4, wherein the hilt carries a landmark, the landmark indicating a reference point for the hilt that facilitates the determination of the overlay position and the overlay orientation for the virtual blade.

6. The system of claim 1, wherein the image sensor is mounted on the display and the field of view of the image sensor is a function of a position and an orientation of the display.

7. The system of claim 1, wherein the first motion and orientation sensor includes an inertial measurement unit, a magnetic position sensor, a radio-frequency position sensor, or a combination thereof.

8. A method for interacting with a virtual interface, the method comprising:
- determining an overlay image depicting a virtual interface and a virtual blade of a virtual weapon, wherein displaying of the overlay image creates an augmented reality environment such that the virtual interface and the virtual blade are perceived as being present in a real-world environment;
- generating visual output signals conveying visual information within a field of view of an image sensor;
- generating first motion and orientation output signals conveying motion and orientation information of a display;
- determining an overlay position and an overlay orientation for the virtual interface based on the visual output signals, the first motion and orientation output signals, or a combination thereof, wherein the virtual interface is placed within the overlay image according to the overlay position and the overlay orientation for the virtual interface, the virtual interface including a virtual object and a second virtual object, wherein interactions with the virtual object and the second virtual object cause one or more changes to the virtual interface;
- determining a blade overlay position and a blade overlay orientation for the virtual blade based on the visual output signals, wherein the virtual blade is placed within the overlay image according to the blade overlay position and the blade overlay orientation for the virtual blade;
- effectuating displaying of the overlay image on the display such that the virtual object and the second virtual object appear as a part of the virtual interface, and the virtual blade appears to be attached to a physical hilt present in the real-world environment; and
- determining occurrences of the interactions with the virtual object and the second virtual object, and changing the virtual interface based on individual ones of the interactions, the interactions with the virtual object and the second virtual object being based on the blade overlay position and the blade overlay orientation for the virtual blade, and the overlay position and the overlay orientation for the virtual interface, such that:

responsive to determining an occurrence of a first interaction with the virtual object, changing the virtual interface in accordance with a first instruction to change the virtual interface, wherein the first instruction to change the virtual interface includes a command to provide more information regarding the virtual object;

responsive to determining an occurrence of a second interaction with the virtual object, change the virtual interface in accordance with a second instruction to change the virtual interface, wherein the second instruction to change the virtual interface includes a command to change the virtual interface into another virtual interface;

responsive to determining an occurrence of the first interaction with the second virtual object, change the virtual interface in accordance with a third instruction to change the virtual interface, wherein the third instruction to change the virtual interface includes a command to exit the virtual interface;

responsive to determining an occurrence of the second interaction with the second virtual object, change the virtual interface in accordance a fourth instruction to change the virtual interface; and wherein the first interaction includes a slashing interaction, and the second interaction include a stabbing interaction.

9. The method of claim 8, wherein the first instruction is associated with a first interaction type and the second instruction is associated with a second interaction type, the first interaction type differing from the second interaction type, the method further comprising determining an interaction type with the virtual object.

10. The method of claim 9, wherein the first interaction type includes the slashing interaction and the second interaction type includes the stabbing interaction.

11. The method of claim 8, wherein a second motion and orientation sensor is mounted on the hilt, the second motion and orientation sensor configured to generate second motion and orientation output signals conveying motion and orientation information of the hilt.

12. The method of claim 11, wherein the hilt carries a landmark, the landmark indicating a reference point for the hilt that facilitates the determination of the overlay position and the overlay orientation for the virtual blade.

13. The method of claim 8, wherein the image sensor is mounted on the display and the field of view of the image sensor is a function of a position and an orientation of the display.

14. The method of claim 8, wherein the first motion and orientation sensor includes an inertial measurement unit, a magnetic position sensor, a radio-frequency position sensor, of a combination thereof.

\* \* \* \* \*